United States Patent [19]
Belart

[11] Patent Number: 4,807,942
[45] Date of Patent: Feb. 28, 1989

[54] HYDRAULIC BRAKE SYSTEM WITH SLIP CONTROL

[75] Inventor: Juan Belart, Walldorf, Fed. Rep. of Germany

[73] Assignee: ITT Industries, Inc., New York, N.Y.

[21] Appl. No.: 495,208

[22] Filed: May 16, 1983

[30] Foreign Application Priority Data

Jun. 11, 1982 [DE] Fed. Rep. of Germany ....... 3222105

[51] Int. Cl.$^4$ .............................................. B60T 8/02
[52] U.S. Cl. ..................................... 303/114; 303/116
[58] Field of Search ................ 188/345; 303/114, 116, 303/10, 52; 60/550, 547.1, 548, 581, 579, 580, 582

[56] References Cited

U.S. PATENT DOCUMENTS

| | | | |
|---|---|---|---|
| 3,976,171 | 8/1976 | Belart | 303/52 |
| 3,999,808 | 12/1976 | Belart | 303/116 |
| 4,440,454 | 4/1984 | Belart et al. | 303/114 |

FOREIGN PATENT DOCUMENTS

| | | |
|---|---|---|
| 0003290 | 8/1979 | European Pat. Off. . |
| 1618250 | 11/1950 | Fed. Rep. of Germany . |
| 1983837 | 4/1968 | Fed. Rep. of Germany . |
| 2942517 | 4/1981 | Fed. Rep. of Germany . |
| 3020720 | 12/1981 | Fed. Rep. of Germany . |
| 2290334 | 6/1976 | France . |
| 2086507 | 5/1982 | United Kingdom . |
| 2086509 | 5/1982 | United Kingdom . |

*Primary Examiner*—John W. Caldwell, Sr.
*Assistant Examiner*—Alvin Oberley
*Attorney, Agent, or Firm*—James B. Raden

[57] ABSTRACT

The hydraulic brake system with slip control comprises two master cylinder pistons for the operation of the vehicular brakes and in which hydraulic medium tapped from the wheel brake during slip control is returned to the wheel brakes from an auxiliary pressure source via a master cylinder piston gasket acting as check valves. The operating stroke of the master cylinder pistons is limitable by suitable pressurization of a positioning piston. An open connection between the working chambers of the master cylinder and a reservoir is provided, in the brake-released position, solely via the control valve so as to enable the brake circuits connected with the master cylinder to be pressurized right from the beginning of the braking action.

2 Claims, 2 Drawing Sheets

HYDRAULIC BRAKE SYSTEM WITH SLIP CONTROL

BACKGROUND OF THE INVENTION

The present invention relates to a hydraulic brake system with slip control, in particular for motor vehicles, in which at least one master cylinder piston is provided for the operation of a vehicular brake, in which hydraulic medium tapped from the wheel brake during slip control is supplied to the wheel brake from an auxiliary pressure source via a master cylinder gasket acting as check valve, in which the master cylinder piston is acted upon by a servo pressure in the direction of operation proportional to the operating force, and in which inlet bores of the master cylinder communicate with the control pressure side of a control valve.

A brake system with the characteristics referred to above is disclosed in the copending U.S. patent application of J. Belart, J. Burgdorf, D. Kircher, H. W. Bleckmann and L. Weiss, Ser. No. 316,153, filed Oct. 28, 1981, now U.S. Pat. No. 4,416,491 assigned to assignee as the present application. A master cylinder with two master cylinder pistons arranged one behind the other forms a component of this brake system. The master cylinder pistons are operable via a piston rod connected with a brake pedal. If an operating force is exerted on the brake pedal the gaskets of the master cylinder pistons will override so-called expansion bores and, thus, interrupt communication between the working chambers of the master cylinder and an unpressurized reservoir. Upon a further displacement of the master cylinder pistons there will be a pressurization of the working chambers of the master cylinders and the vehicular brakes connected with the working chambers will be applied.

Electromagnetically operable valves are associated with the vehicular brakes. These valves will keep the slip of the wheels down to an advantageous extent in the event of suitable control by slip-monitoring electronics.

Between the pedal-operable piston rod and the master cylinder piston a throttle valve is arranged which essentially comprises a piston which is axially displaceable in the master cylinder bore and which has a pedal-close valve seat and of a valve closure member shaped at the piston rod. As long as there is no danger of a lock-up the pedal force will be transmitted mechanically to the master cylinder pistons via the piston rod and the piston which carries the valve seat of the throttle valve. If the slip-monitoring electronics detect an unduly high slip at one or at several vehicular wheels an electric-motor-driven pressure medium pump will be operated which now will suck hydraulic medium from the unpressurized reservoir, supplying it to the throttle valve. Thus, dependent on the operating force applied to the brake pedal a dynamic pressure will result at the delivery side of the pressure medium pump. This pressure will be transmitted to the pedal-close front sides of the master cylinder pistons and from there the pressure medium may flow via axial bores of the master cylinder pistons and via gaskets acting as a check valve into the brake circuits connected with the working chambers if pressure medium had been tapped from the wheel brakes for the purpose of a pressure reduction.

Moreover the dynamic pressure generated at the delivery section of the pump by means of the throttle valve pressurizes a positioning piston having a larger effective surface than the master cylinder piston and is displaced contrary to the direction of operation against a stop formed in the housing. In doing so, the positioning piston will come into mechanical contact with the piston carrying the valve seat of the throttle valve and will return the latter, if necessary, against the pedal force in the direction of release of the brake. The positioning piston will ensure that there will always remain a sufficient amount of fluid in the working chambers of the tandem master cylinder. Thus, a movement of the master cylinder pistons down to the bottom of the master cylinder will be impossible.

Upon a failure of the pressure medium pump or of the pump drive there will be no pressurization of the positioning piston. Upon an application of the brake in such cases of disturbance, the piston with the valve seat will abut at the positioning piston and displace the same against the force of a relatively weak compression spring in the direction of operation. This displacement will be transmitted to the master cylinder pistons as in normal braking actions. Thus, the working chambers of the master cylinder and the wheel brakes connected thereto will be pressurized. A normal operation of the vehicular brakes will, therefore, be ensured in any case in the above-mentioned conditions of disturbance.

In brake systems of the type referred to above it is known that at first a certain servo pressure must be generated by the brake valve or control valve before pressurizing of the wheel brakes connected to the master brake cylinder.

SUMMARY OF THE INVENTION

It is, therefore, an object of the present invention to develop a hydraulic brake system with the characteristics mentioned above so as to ensure that the brake circuits connected to the master brake cylinder will be pressurized before the master cylinder pistons start to move.

A feature of the present invention is the provision of a hydraulic brake system with slip control comprising: at least one master cylinder piston disposed axially within a housing for operation of a vehicular brake; an auxiliary pressure source providing hydraulic braking medium via a gasket of the master cylinder piston acting as a check valve to replace hydraulic braking medium removed from the brake during slip control; a control valve to provide a servo pressure acting upon the master cylinder piston in the direction of operation, the servo pressure being proportional to an operating force; inlet bores in the housing communicate with a working chamber associated with an adjacent surface of the master cylinder piston and a control pressure side of the control valve; and an open connection between the working chamber and a reservoir provided solely by the control valve. In such an embodiment the working chambers of the master cylinder and the vehicular brakes connected to them will be pressurized as soon as a minimum of pressure is generated at the throttle valve due to the action of a force on the brake pedal. By suitably dimensioning the throttle valve and the expansion bores it may be achieved that the vehicular brakes will receive the required volume of brake fluid, with the expansion bores still open, so that upon a further application of the brake a braking action will ensue without any further delay.

A further advantageous embodiment of the subject matter of the present application results when a tappet is provided at the pedal-close front surface of the master cylinder piston which, sealingly penetrates the positioning piston and abuts at the piston carrying the valve seat of the control valve. In this connection it will be a further advantage if the surface area of the tappet equals the effective pressure receiving area of the piston carrying the valve seat. In this instance, the amount of the servo pressure will be directly proportional to that of the force applied to the brake pedal. Moreover, however, other dimensionings of the effective surfaces are also possible. It will e.g. be possible to rate the effective pressure receiving area of the piston carrying the valve seat larger than the effective surface of the positioning piston. With such a rating, a hydraulic boosting force will be generated in addition to the pedal force as is known from hydraulic brake boosters.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
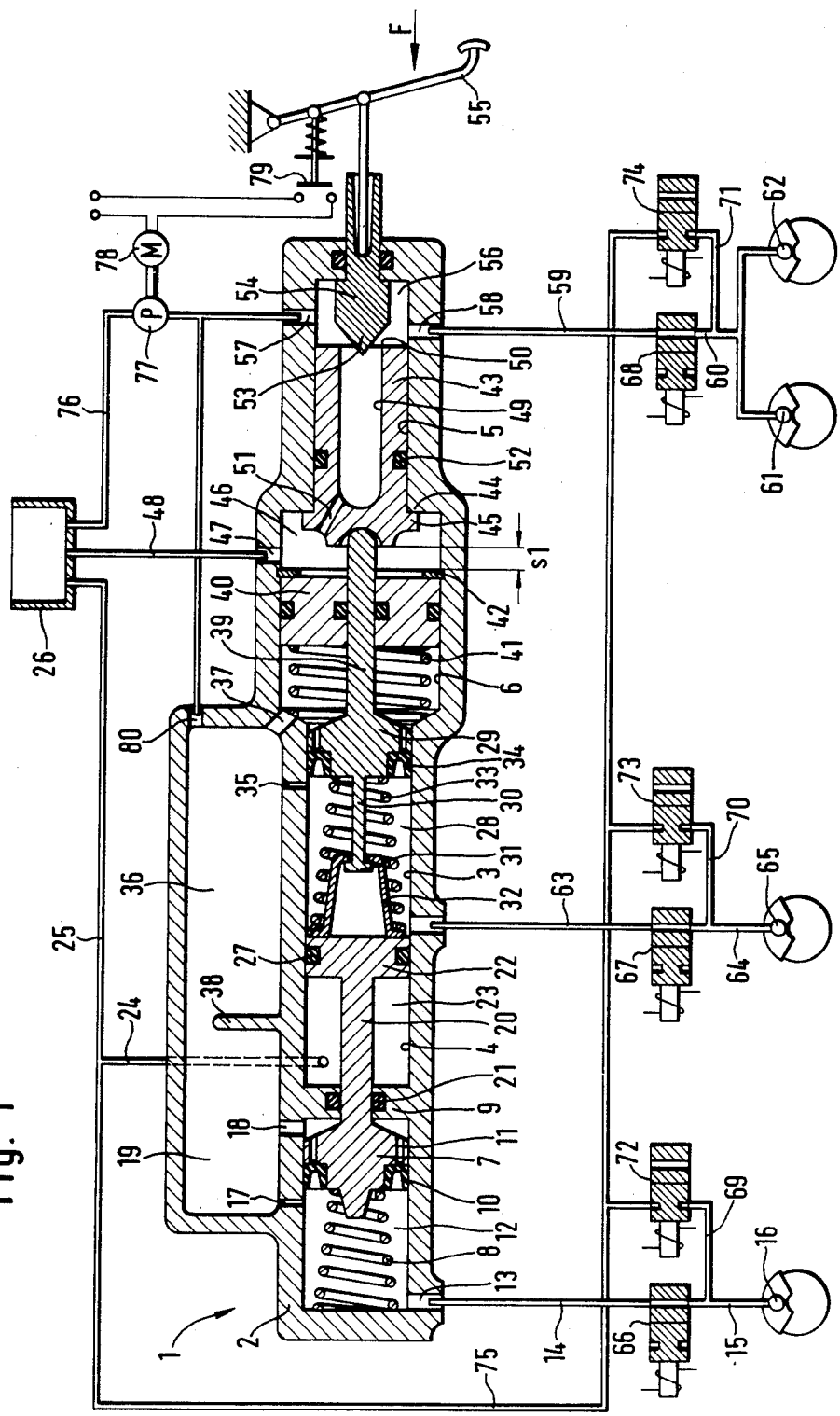
FIG. 1 is a longitudinal cross-sectional view of a brake system with a brake actuating device in accordance with the principles of the present invention.

In FIG. 1, the reference numeral 1 identifies a master brake cylinder with a housing 2 having an axial cylinder bore 3. The axial cylinder bore 3 has two bore sections 4 and 5 of smaller diameter and, a bore section 6 having a larger diameter therebetween. The smaller diameter bore section 4 on the left, as seen in the drawing, houses a first master cylinder piston 7 pressed by a piston return spring 8 against a pedal-close partition wall 9. At the master cylinder piston 7 a gasket 10 is arranged which acts as a check valve and cooperates with axial passages at the outer area of the master cylinder piston 7 so as to ensure that the pressure medium will solely flow from the pedal-close front surface of the master cylinder piston 7 to the front surface of the master cylinder piston 7 which defines a first working chamber 12. The first working chamber 12 of the master brake cylinder 1 has a port 13 in the housing 2 which communicates with a wheel brake 16 of a motor vehicle via pressure lines 14 and 15, the wheel brake 16 preferably being arranged at the front axle of the motor vehicle. In the housing 2 of the master brake cylinder 1 further an expansion bore 17 and an inlet 18 are provided. The expansion bore 17 and the inlet 18 communicate with a storage chamber 19.

At the pedal-close front side of the master cylinder piston 7 a cylindrical extension is provided which, with an annular seal 21 being used, is passed through the partition wall 9 and which, at the pedal-close end, is enlarged up to the diameter of the bore section 4. Between the partition wall 9 and the enlarged section 22 of the cylindrical extension 20 a chamber 23 is formed which communicates with a reservoir 26 via a channel 24 and a pressure line 25. The enlarged section 22 of the cylindrical extension 20 whose surface area has contact with the bore section 4 likewise has an annular seal 27.

In FIG. 1, to the right of the enlarged section of the cylindrical extension 20, a second working chamber 28 is formed which is closed by a second master cylinder piston 29. Referring to the drawing, the left front surface of the second master cylinder piston 29 has a pin 30 enlarged at its end. The enlarged head 31 of pin 30 reaches beyond a spring plate 32, gripping it from behind. Arranged between the spring plate 32 and the front side of the second master cylinder piston 29 which faces the spring plate 32 is a further piston return spring 33. Referring to the illustrated rest position of the master brake cylinder, spring 33 keeps the enlarged section 22 of the cylindrical extension 20 and the second master cylinder piston 29 at a maximum distance with respect to each other. The second master cylinder piston 29 also has a gasket 34 acting likewise as check valve so as to ensure that pressure medium will flow into the second working chamber 28 solely via axial channels in the second master cylinder piston 29. In the second working chamber 28 moreover a further expansion bore 35 ends which branches off from a second storage chamber 36. Further, via an inlet 37 there exists a connection from the second storage chamber 36 to the pedal-close front surface of the second master cylinder piston 29. The storage chambers 19 and 36 have hydraulic communication with each other, a drain baffle 38 being arranged between the storage chambers 19 and 36.

Referring to the drawing, the right front surface of the second master cylinder piston 29 defines the larger diameter bore section 6 of the axial cylinder bore 3 of the master brake cylinder 1. At this front surface, also, a cylindrical extension 39 is provided which penetrates a positioning piston 40 sealingly guided within the bore section 6. The cylindrical extensions 20, 39 having a smaller cross-sectional area than the master cylinder pistons 7, 29. The positioning piston 40 is kept in abutment at a pedal-close stop 42 by means of a compression spring 41 in the illustrated brake-released position. The rating of the compression spring 41 is relatively weak. The sole function of spring 41 is to keep the positioning piston 40 at the stop 42, overcoming the frictional forces caused by seals.

The cylindrical extension 39 penetrating positioning piston 40 has mechanical contact with a piston 43 guided in the smaller diameter bore section 5. In the brake-released position, the movement of the piston 43 is limited by a shoulder 44 of the housing and by a projection 45. Between the positioning piston 40 and the piston 43, in the bore section 6, a chamber 46 is formed which communicates with the unpressurized reservoir 26 via a port 47 of the housing and a pressure line 48.

The front surface of the piston 43 remote from chamber 46 has a blind bore 49 the end of which is constructed as valve seat 50. There exists a hydraulic connection from blind bore 49 to chamber 46 via a channel 51. The surface area of piston 43 is sealed by using an annular seal 52.

Facing the valve seat 50, a valve closure member 53 is arranged which is a component of an actuating piston 54 which, on its part, is sealingly passed out of the housing 2 of the master brake cylinder 1 and which is axially displaceable by means of a brake pedal 55.

The chamber 56 into which the actuating piston 54 is penetrating has two ports 57 and 58 in the housing. Port 58 communicates with wheel brakes 61 and 62 via pressure lines 59 and 60, the wheel brakes preferably being arranged at the rear axle of a motor vehicle. Via pressure lines 63 and 64, the second working chamber 28 of the master brake cylinder 1 likewise communicates with a wheel brake 65 preferably arranged at the front axle of a motor vehicle. In the pressure lines 14 and 15, 63 and 64, 59 and 60, valves 66, 67 and 68 respectively are connected, all of which are electromagnetically operable. In a currentless condition, i.e. if valves 66, 67 and 68 are not excited, the valves 66, 67 and 68 will connect the mentioned pressure lines with one another. Further, pressure lines 69, 70 and 71 each branch off from the wheel brakes 16, 65, 61 and 62, leading to electromagnetically operable valve 72, 73 and 74. In a currentless condition valves 72, 73 and 74 will be in their blocking position. When excited by slip-monitoring electronics, valves 72, 73 and 74 will come into an open position. The outlet sides of the electromagnetically operable valves 72, 73 and 74 are connected with a common return line 75 passing over into the pressure line 25 and thus communicating with the unpressurized reservoir 26.

Further, a pressure line 76 is connected to the unpressurized reservoir 26, line 76 leading to the suction side of a pressure medium pump 77. Pressure medium pump 77 is drivable by an electric motor 78 which will switch on as soon as an operating contact 79 closes upon an operating force being applied to the brake pedal 55. The delivery side of the hydraulic pump 77, on the one hand, communicates with the port 57 of housing 2 and, on the other hand, with a port 80 of housing 2, port 80, on its part, communicating with the storage chambers 19 and 36.

Figure 2:
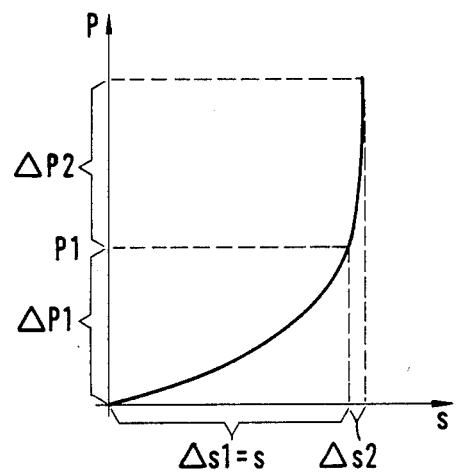
FIG. 2 is a graph of the pressure achievable by means of the brake actuating device of FIG. 1.

In the following, the mode of operation of the brake system described above will be explained in more detail, reference being made to FIG. 2. FIG. 2 shows the course of the pressure achievable by means of the explained brake system in the working chambers 12 and 28 of the master brake cylinder 1, dependent on the operating travel. The explanation starts with the brake-released position represented in FIG. 1 in which the working chambers 12 and 28 and the wheel brakes 16, 65, 61 and 62 are pressure-relieved. Referring to FIG. 1, the left front surface of piston 43 has a maximum distance s1 with respect to the confronting front surface of positioning piston 40.

As soon as an operating force F acts on brake pedal 55 the electric contact 79 will close and switch on the electric motor 78. Thus, hydraulic pump 77 will be put into operation, sucking hydraulic medium from the unpressurized reservoir 26 and delivering the hydraulic medium to the port 57 of housing 2. At the first moment of the operation the throttle valve 50, 53 will be open. Thus, the hydraulic medium delivered by hydraulic pump 77 will flow through blind bore 49 of piston 43, channel 51, chamber 46, port 47 of housing 2 and pressure medium line 48 back to unpressurized reservoir 26.

As soon as the valve closure member 53 abuts at the valve seat 50 of piston 43, the pressure at the delivery side of the hydraulic pump 77 will increase. The accumulated pressure will further proceed via the port 58 of housing 2, pressure lines 59 and 60, and the electromagnetically operable valve 68 to the wheel brakes 61 and 62 of the rear axle. The pressure of hydraulic pump 77 further will be supplied to port 80 of housing 2 and will become effective in storage chambers 19 and 36 of the master brake cylinder. Then, pressurized hydraulic medium will flow via expansion bores 17 and 35 into working chambers 12 and 28 of master brake cylinder 1 and via pressure lines 14, 15 and 63, 64 and the electromagnetically operable valves 66 and 67 to wheel brakes 16 and 65 of the front axle, respectively. The pressure prevailing in storage chambers 19 and 36 will further proceed via inlets 18 and 37 to the pedal-side front surfaces of the master cylinder pistons 7 and 29 and exerts a force in the direction of operation due to the effective front surface of the master pistons being pressurized. Due to such a pressurization, a force will likewise be exerted on the positioning piston which will assist the force of the compression spring 41 and press the positioning piston with a greater force against the stop 42. The pressure established in the chamber 56 or rather the pressure in the wheel brakes 61 and 62 of the rear axle will moreover displace piston 43 in the direction of operation by pressurizing its effective surface. Since the pressure in chamber 56 also acts on the actuating piston 54 right from the beginning of the braking action a reaction force will be felt at the brake pedal 55 which will counteract the operating force F and will provide feedback information to the driver of the vehicle concerning the intensity of the braking action initiated by him. If the pressure in chamber 56 increases so that the frictional forces of the annular seal 52 at piston 43 are overcome piston 43 will move to the left, as seen in the drawing. This leftward movement will be transmitted via cylindrical extension 39 to master cylinder piston 29. Thus, working chamber 28 of master brake cylinder 1 will be pressurized. At the same time, master cylinder piston 7 hydraulically coupled with master cylinder piston 29 will be displaced in the direction of operation. Thus, also the working chamber 12 and the wheel brake 16 of the front axle will be pressurized. After the master cylinder pistons 7 and 29 have been displaced a small distance expansion bores 17 and 35 will be closed. Now the pressure generated by hydraulic pump 77 will only act on the pedal-side front surfaces of the master cylinder pistons 7 and 29, exerting corresponding forces on the master cylinder pistons 7 and 29 in the direction of operation. If brake pedal 55 is kept in this intermediate position throttle valve 50, 53 will come into a relief position in which excess pressure medium will be returned to the unpressurized reservoir 26. Upon an increase of the operating force F acting on the brake pedal 55 the pressure in chamber 56 will continue to increase, which also results in the pressure in the wheel brakes 16, 65, 61 and 62 increasing in accordance with the preceding statements.

This pressure increase will continue until piston 43 has travelled the distance s1 and abuts at the pedal-side front surface of positioning piston 40. In this operating condition, the pressure value P1 according to FIG. 2 will have been established. By pressurization of the pedal-remote front surface of the positioning piston 40 by means of the pressure P1 and due to the relatively large effective surface of the front surface of positioning piston 40, piston 43 will in any case be arrested against the operating force F and the hydraulic boosting force in chamber 56. A further pressure increase in chamber 56 will be possible only by increasing the operating force F and by having a stronger force cause the valve closure member 53 of the throttle valve to abut at the valve seat 50. A remarkable pedal travel, however, will not be effected in doing so. The pressure generated in this way in chamber 56 is likewise effective in the storage chambers 19 and 36. Thus, pressure medium will now flow into working chambers 12 and 28 of the master cylinder 1 via the axial channels 11 and the gaskets 10, 34. Such a pressure increase may be continued until the maximum pressure of the hydraulic pump 77 is reached. Upon releasing the brake pedal, the aforedescribed operations will reverse until the illustrated rest position will have been restored.

In FIG. 2 the pressure increase is marked Δ P1 up to a pressure P1 of e.g. 70 bars, with a distance Δ s1=s1 having been travelled. It is discernible that the gradient of the pressure increase Δ P1 is relatively small. From the pressure value P1 until the maximum pressure of the hydraulic pump, a pressure increase Δ P2 can be achieved which theoretically may be achieved without any additional travel of the brake pedal 55. In fact, however, during the pressure increase Δ P2 a small distance Δ s2 will be travelled, which is determined by the mechanical elasticities of the brake system. In any case, from the pressure diagram represented in FIG. 2 it is clear that, with travelling the very small pedal travel Δ s2, an incomparatively higher pressure gradient will be the result.

If non-illustrated slip-monitoring electronics detect an imminent locking-up condition at one or at several of the vehicular wheels, the corresponding electromagnetically operable valves 72, 73 and 74 will be actuated, thereby tapping pressure medium from the wheel brakes. The pressure medium tapped from the brakes will be returned into the corresponding brake circuits via the gaskets 10 and 34.

If e.g. there is a failure of the hydraulic pump 77 or of the pump-driving electric motor 78 or if there is another fault in the supply of the auxiliary energy, it will be possible to pressurize the working chambers 12 and 28 and the wheel brakes 16 and 65, connected with the working chambers 12 and 28, in a purely mechanical manner. To this end, piston 43 at first will be moved by the actuating piston 54 until the piston 43 will abut at the pedal-side front surface of positioning piston 40. At this moment wheel brakes 16 and 65 will still be unpressurized. Upon a further displacement of piston 43 positioning piston 40 will be carried along against the force of the relatively weak compression spring 41. The master cylinder pistons 7 and 29 will displace themselves in the direction of operation, blocking the expansion bores 17 and 35, and pressurizing working chambers 12 and 28. In such cases of disturbance there will admittedly be no braking action at the wheel brakes 61 and 62 of the rear axle. However, by suitably rating the system, without any difficulties, it will be possible to achieve the minimum braking action of the wheel brakes 16 and 65 of the front axle as prescribed by the law. However, the required force applied to brake pedal 55 will have to be higher. In any case, the emergency function of the brake system is safeguarded in this way.

While I have described above the principles of my invention in connection with specific apparatus it is to be clearly understood that this description is made only by way of example and not as a limitation to the scope of my invention as set forth in the objects thereof and in the accompanying claims.

I claim:

1. A hydraulic brake system with slip control comprising:
   at least one master cylinder piston disposed axially within a housing for operation of a vehicular brake operated by a brake pedal;
   a hydraulic pump providing hydraulic braking medium by way of a gasket of said master cylinder piston, said gasket acting as a check valve to replace hydraulic braking medium removed from said brake during slip control;
   a switch activated by said brake pedal for controlling said hydraulic pump;
   a control valve cooperating with said hydraulic pump to provide a servo pressure acting upon said master cylinder piston in the direction of operation, said servo pressure being proportional to an operating force applied to said brake pedal;
   inlet bores in said housing communicating with a working chamber associated with an adjacent surface of said master cylinder piston and a control pressure side of said control valve;
   an open connection between said working chamber and a reservoir provided by said control valve solely when said control valve is open;
   including a tappet disposed on a surface of said piston remote from said working chamber, said tappet sealingly penetrating a positioning piston disposed between said master cylinder piston and a control piston carrying a valve seat for said control valve, said tappet abutting said control piston;
   the pedal-side front surface of said master cylinder piston defining a bore section of said housing in which the penetrating piston is housed and said control piston guided in another bore section of said housing; said penetrating piston bore section being larger than said control piston bore section; and
   the cross-sectional area of said tappet being smaller than the cross-sectional area of said master cylinder piston which causes the master cylinder piston to be displaced in the direction of operation in response to the servo pressure acting upon the effective front surface of said master cylinder piston.

2. A system according to claim 1 wherein the surface area of said tapped equals the effective pressure receiving area of said control piston.

* * * * *